March 7, 1939.                L. Y. FAUST                2,149,427
                        SUBSURFACE EXPLORATION
                          Filed Oct. 12, 1937
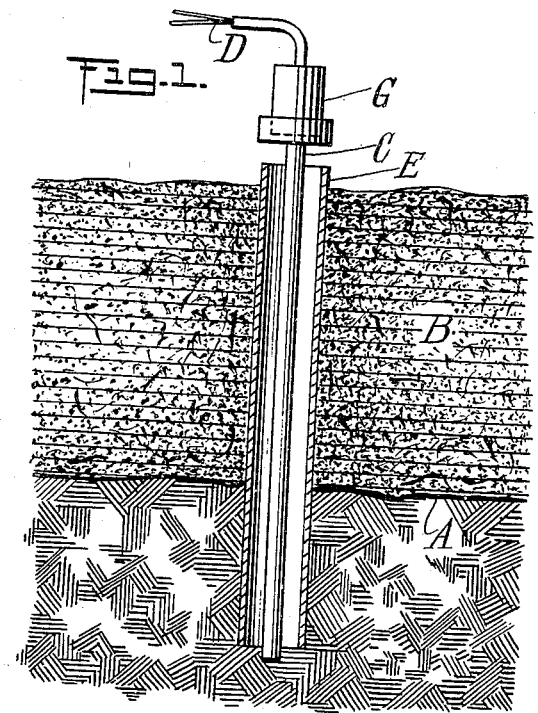
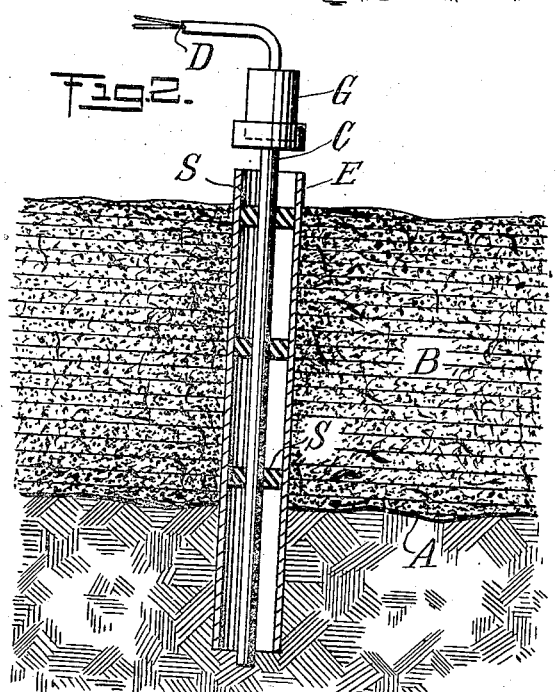
INVENTOR.
Lawrence Y. Faust
BY
Kenyon & Kenyon
ATTORNEY.

Patented Mar. 7, 1939

2,149,427

UNITED STATES PATENT OFFICE 2,149,427

SUBSURFACE EXPLORATION

Lawrence Y. Faust, Tulsa, Okla., assignor to Geophysical Research Corporation, New York, N. Y., a corporation of New Jersey Application October 12, 1937, Serial No. 168,644

3 Claims. (Cl. 181—0.5)

This invention relates to sub-surface exploration.

One method of sub-surface exploration involves the generation of artificial seismic waves at a point near the earth's surface and recording the reception of such waves at a plurality of adjacent points located at a substantial distance from the point of origin after reflection from a sub-surface formation. In certain localities, there is a soft surface layer over a firm underlying material, the surface layer being muck, marsh land, sand, water, etc., and when wave receivers such as geophones are placed on or in such surface layer, it is often very difficult to obtain a satisfactory reflection record. One reason for this fact is that the velocity of sound in such soft material is very low and hence there is apt to be a considerable variation in the time taken for a sound wave to travel from the firm material below the soft surface layer to each of the individual geophones. There are methods of making corrections for this variation, but for extreme accuracy, it is much better if such variations are completely avoided. Also, when the geophones are placed on or in such soft surface material they are subject to extraneous disturbances such as are caused by moving of vegetation on the surface or ripples and waves in the event such surface is a water surface.

It has heretofore been proposed to support a geophone on a rod driven through the superficial layer of soft material into the solid underlying material for the purpose of avoiding the objections above noted. Although this arrangement reduces such objections, a geophone thus supported is subjected to the effect of surface waves transmitted through the soft material.

An object of this invention is to minimize the effects on geophones thus supported of surface waves transmitted through the soft surface material.

According to this invention, the geophones are supported by rods such as iron pipes driven through the superficial layer of soft material until the lower ends of the pipes are firmly implanted in the solid material underlying the surface layer. Around each rod is provided a casing preferably of large enough diameter so that moderate bending of the rod will not bring it into contact with the casing. Alternately, soft rubbber separator rings may be used between the pipe and casing to prevent contact. With this arrangement, the geophone is in effect planted in the solid material rather than in the soft surface material and the surrounding casing prevents surface waves transmitted through the surface material from affecting the rod.

Other objects, novel features and advantages of this invention will become apparent from the following specification and accompanying drawing, wherein:

Fig. 1 is a schematic view illustrative of the invention, and

Fig. 2 is a similar view of a modification.

In the drawing, the upper surface of hardpan or the like is designated by the reference character A while the reference character B designates a surface layer of soft material such, for example, as muck, marsh land or water. Rods C are sunk through the layer B and have their lower ends embedded in the hardpan. These rods may be solid or may be iron pipes of any suitable size such, for example, as one inch pipe. Geophones G are rigidly fastened to the upper ends of the pipe C and cables D lead to a wave recorder (not shown). A pipe or other casing E of larger diameter than the rod or pipe C surrounds the rod C and extends into the hard underlying material by which it is supported. The interior of the casing E is empty except for the rod C. The casing, however, may be filled with water or mud without greatly affecting the action of the arrangement. The casing forms a rigid wall around the material in the hole and prevents to a large extent the entrance of the waves existing in the soft surface material. The length of the rod C and casing E seems to be immaterial so long as they are both driven into the underlying material far enough to make a firm contact so that the rod will move when the hardpan is vibrated by the oncoming artificial seismic wave and the casing will prevent surface waves transmitted through the soft material from affecting the rod.

In the modification disclosed in Fig. 2, the casing E is arranged around the rod C, the same as in the modification of Fig. 1, but soft rubber spacers S are interposed between the rod and the casing. In this modification, the casing may be of smaller diameter than the casing of Fig. 1 inasmuch as the spacers S prevent contact of the rod with the casing.

Waves reflected from a sub-surface formation are transmitted through the rod C to the geophone G by which they are translated into electrical impulses in the usual manner, such electrical impulses being impressed on the recorder to produce a record of the received waves. The seismic waves received by the geophones are generated at the point of origin in the same way as heretofore. The rods C can be composed of any suitable rigid material, but preferaly are constituted of iron pipe but it is to be understood that in the claims the word "rod" is used to describe any smooth surface support composed of rigid material.

I claim:

1. A device for receiving artificial seismic waves transmitted through earth having a surface layer of soft material overlying the hard material which comprises a rod of sufficient length to pass through the soft surface layer into the hard material therebelow, a casing of sufficient length to pass through said surface layer, said casing enclosing and being spaced from said rod throughout its entire length and a wave detector mounted on the upper end of said rod.

2. A device for receiving artificial seismic waves transmitted through earth having a surface layer of soft material overlying the hard material which comprises a rod of sufficient length to pass through the soft surface layer into the hard material therebelow, a casing of sufficient length to pass through said surface layer, said casing enclosing and being spaced from said rod throughout its entire length, resilient means interposed between said rod and casing and a wave detector mounted on the upper end of said rod.

3. A device for receiving artificial seismic waves transmitted through earth having a water surface overlying hard material which comprises a rod of sufficient length to pass through the water surface into the hard material therebelow, a casing of sufficient length to pass through said water surface, said casing enclosing and being spaced from said rod throughout its entire length and a wave detector mounted on the upper end of said rod.

LAWRENCE Y. FAUST.